(12) United States Patent
Bauerfeind

(10) Patent No.: US 6,944,831 B1
(45) Date of Patent: Sep. 13, 2005

(54) OPERATOR BUTTONS AS ACTIVE BUTTONS

(75) Inventor: Dieter Bauerfeind, Bonn (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/646,626

(22) PCT Filed: Dec. 23, 1998

(86) PCT No.: PCT/DE98/03780

§ 371 (c)(1),
(2), (4) Date: Sep. 20, 2000

(87) PCT Pub. No.: WO99/49371

PCT Pub. Date: Sep. 30, 1999

(30) Foreign Application Priority Data

Mar. 20, 1998 (DE) ................. 198 12 423

(51) Int. Cl.[7] .......................... G05B 15/00; G06F 3/00
(52) U.S. Cl. ................ 715/864; 700/75; 700/83; 703/13
(58) Field of Search ................ 345/864, 164, 345/736, 204–206; 700/83, 17–18, 27, 11–12, 700/40, 75–76; 340/461; 715/700, 864; 703/13–16

(56) References Cited

U.S. PATENT DOCUMENTS

| | | | |
|---|---|---|---|
| 5,797,085 A | * | 8/1998 | Beuk et al. .................... 455/88 |
| 5,859,846 A | * | 1/1999 | Kim et al. ............. 370/395.62 |
| 5,877,957 A | * | 3/1999 | Bennett ........................ 700/86 |
| 5,997,167 A | * | 12/1999 | Crater et al. ................... 700/79 |
| 6,040,829 A | * | 3/2000 | Croy et al. ................... 345/864 |
| 6,061,668 A | * | 5/2000 | Sharrow ..................... 705/400 |
| 6,369,841 B1 | * | 4/2002 | Salomon et al. ............ 345/854 |
| 6,467,039 B1 | * | 10/2002 | Fredriksson ................ 713/151 |

FOREIGN PATENT DOCUMENTS

DE            41 25 176       2/1993

OTHER PUBLICATIONS

"Philips Revolutionizes Home Theater Control", Sep. 11, 1998, Press Release.*
Microsoft Press Computer Dictionary, Third Edition, Microsoft Press, (c)1997, p. 464.*

* cited by examiner

Primary Examiner—Raymond J. Bayerl
Assistant Examiner—Brian J. Detwiler
(74) Attorney, Agent, or Firm—Kenyon & Kenyon

(57) ABSTRACT

A programmable controller has a processing unit, a display screen, an operator unit, and signal inputs and signal outputs. The processing unit, the display screen, the operator unit, the signal inputs, and signal outputs are accommodated in a common housing, and switching functions can be programmed by the user on the basis of predetermined functions by using a menu-assisted user interface on the display screen. A button of the operator unit can be switched to an active button through the use of a programmable function, such that the sequence of a switching function depends on operation of this button.

11 Claims, 1 Drawing Sheet

OPERATOR BUTTONS AS ACTIVE BUTTONS

FIELD OF THE INVENTION

The present invention relates to a programmable controller having a processing unit, a display screen, an operator unit and signal inputs and signal outputs, where the processing unit, the display screen, the operator unit, the signal inputs and signal outputs are accommodated in a common housing, and where switching functions can be programmed by the user on the basis of predetermined functions by using a menu-assisted user interface on the display screen.

RELATED TECHNOLOGY

Such controllers are often used as intelligent switch elements in industry, in science and in households. With these controllers, switching sequences between the input voltages applied to the signal inputs and the signal outputs can be programmed in a variety of ways. Internal modules such as counter modules or timer modules and finished functions of an implemented operating system are made available to the user for his programs. The programs are entered either through the menu-assisted interface with the operator buttons present on the controller or they are entered by means of an external computer (PC) connected by a data line.

One disadvantage in creating the switching programs is that it is extremely difficult or impossible to test the running of these programs. For example, the required voltages must be applied to the signal inputs for testing in order to trigger the switching sequence and the signal output associated with it. Likewise, it is very difficult to conduct any troubleshooting while the program is running. These programs contribute toward a great uncertainty in operation. Another disadvantage of the known controllers is that once a switching program is running, it can be influenced only through complicated measures or not at all.

SUMMARY OF THE INVENTION

Therefore, an object of the present invention is to create a programmable controller that has a great operational reliability and is convenient to use and its switching programs can be tested easily for correct running without requiring any auxiliary means.

The present invention provides a programmable controller having a processing unit, a display screen (6), an operator unit (4, 5) and signal inputs (2) and signal outputs (3), where the processing unit, the display screen (6), the operator unit (4, 5), the signal inputs (2) and signal outputs (3) are accommodated in a common housing (1), and where switching functions can be programmed by the user on the basis of predetermined functions by using a menu-assisted user interface on the display screen (6). A button of the operator unit (4, 5) can be switched to an active button with the aid of a programmable function, such that the sequence of a switching function depends on operation of this button.

The active button according to the present invention can be used in a variety of ways. It is thus possible with a first especially advantageous embodiment to simulate a signal input by means of the active button. For activation of this button, a function is provided in the operating system so that each of the operator buttons can be declared an active button by means of this function. Operation of the active button defined in this way can then be treated as a logic state instead of an electric input signal within a switching program. Each switching sequence can thus be linked to operation of the active button. The active button functions like an additional input without a terminal.

Since each voltage state at one of the signal inputs can be equated, i.e., simulated, operation of an active button, it is not necessary to have any other auxiliary means such as an independent power supply or sensor for testing a switching program or for troubleshooting. The controller can be programmed and tested at any time without the presence of input voltages. Thus, it can be set up before use at the subsequent site of use. It thus becomes especially simple and convenient to set up switching programs in the programmable controller.

The convenient option of replacing the input signals makes this programmable controller reliable and thus inexpensive for the user because of the low expenditures for repairs and maintenance.

The active buttons can be activated and deactivated in the system parameters of the controller. The initial state is "deactivated." If the buttons are active, they can be used during the program sequence and in the status menu.

In another advantageous embodiment, the active button is set so that when it is operated, a program being run is influenced. In this function as an interrupt, for example, the active button can be used in the manner of an emergency off in a program. To do so, the active button is set at an interrupt of the microcontroller present in the controller or its status is queried in cycles within the switching program. Just as in the first embodiment, the sequence of a switching function thus depends on operation of the active button.

Another possible application of the active button is to provide manual control, bypassing the program sequence, within a switching program. For example, it is possible to use the controller as an automatic timer for roller blinds and nevertheless make it possible for manual control to override the automatic timer by using the active buttons.

The function for activating and deactivating a button is advantageously designed so that the active button can be used anywhere in the programmable switching function. Thus, a flexible use option and thus an especially great operating convenience are guaranteed. To simulate multiple signal inputs, it is advantageous to use a corresponding number of active buttons within a programmable switching function. The number of active buttons used at the same time is limited only to the number of operator buttons on the controller, each of which can be switched as an active button.

It is also advantageous to display the instruction to operate an active button on the display screen. This informs the user of the operating steps required. To notify the user that input is needed, it may be advantageous to combine the instruction to operate the active button with an acoustic signal.

BRIEF DESCRIPTION OF THE DRAWINGS

An embodiment of the controller according to the present invention having active buttons is explained in greater detail below with references to the drawings, in which.

DETAILED DESCRIPTION

Figure 1:
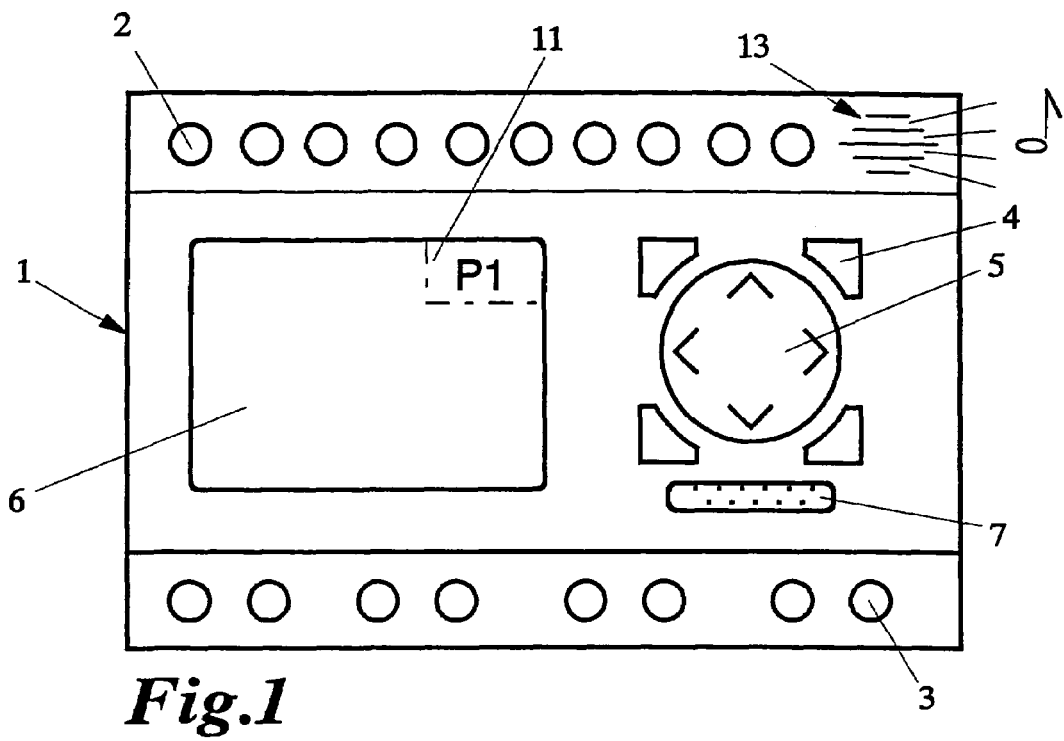
FIG. 1 shows a programmable contoller.

FIG. 1 shows a programmable controller having a housing 1 and a row of voltage inputs 2 (I) and voltage outputs 3 (O).

The programmed controller switches the current flow between inputs 2 and outputs 3 under the control of a program. The program can be entered into a processing unit accommodated in housing 1 by means of operator buttons 4 and multifunction button 5. Each of operator buttons 4 and multifunction button 5 can be defined as an active button. Input and a program sequence can be observed on display screen 6. The requirement to operate an active button in a field 11 is displayed on display screen 6. Otherwise, a menu-assisted user interface is displayed on display screen 6 during programming. The controller can be programmed by an external computer (PC) by means of an interface 7.

Figure 2:
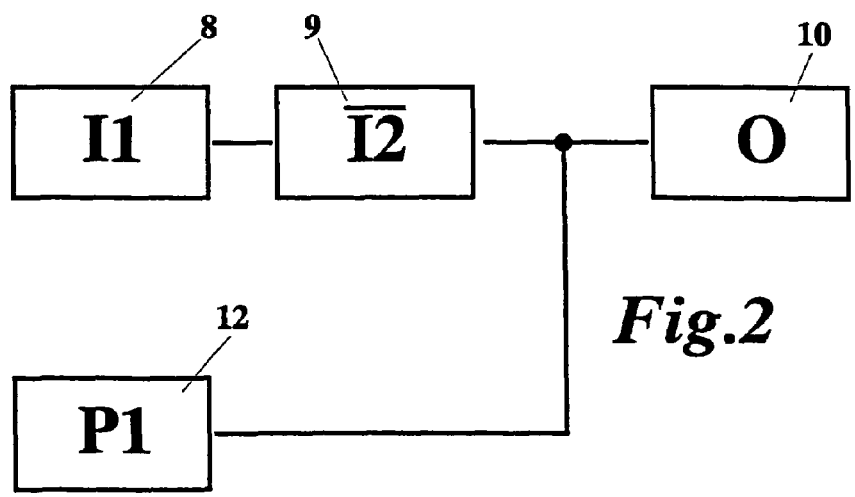
FIG. 2 shows an example of using an active button.

FIG. 2 shows an example of using an active button. Signal inputs 8 and 9 are wired so that a signal (I) must be applied to input 8 and there must be no signal applied to input 9 (Ī) in order to obtain an output signal at signal output 10. The condition for applying the signal to output 10 is operation of operator button 12 (P1), which is also displayed in field 11 on display screen 6 (FIG. 1). Appearance of the instruction to make an entry can be accompanied by an audible signal 13.

What is claimed is:

1. A programmable controller, comprising:
   a processing unit programmed to affect a switching sequence between, one of at least one input signal and at least one simulated input signal, and at least one output signal;
   a display screen including a menu-assisted user interface;
   an operator unit including a button, the button capable of being switched to an active mode using a programmable function;
   at least one signal input terminal configured to receive the at least one input signal;
   at least one signal output terminal separate from the input terminal; and
   a housing, the processing unit, the display screen, the operator unit, the at least one signal input terminal and the at least one signal output terminal being disposed in the housing;
   wherein a switching function of the controller programmable in the programmed switching sequence according to predetermined functions using the menu-assisted user interface, and wherein an operation of the button in the active mode is configured to generate the at least one simulated input signal and to affect the switching sequence of the switching function between the at least one simulated input signal and the at least one output signal.

2. The controller as recited in claim 1 wherein the switching function can be interrupted by operation of the button in the active mode.

3. The controller as recited in claim 1 wherein the operation of the button is performable at any point of the programmable switching function.

4. The controller as recited in claim 1 further comprising a second button capable of affecting the switching function.

5. The controller as recited in claim 1 further comprising a second button and wherein the second button is capable of being switched to an active mode.

6. The controller as recited in claim 1 wherein the display screen is capable of displaying an instruction to operate the active button.

7. The controller as recited in claim 1 wherein the display screen is capable of displaying an instruction to operate the active button and wherein the instruction to operate the active button is accompanied by an acoustic signal.

8. The controller according to claim 1, wherein the switching function of the controller is arranged to switch between input voltages applied to the at least one signal input terminal and the at least one signal output terminal.

9. A programmable controller, comprising:
   a processing unit programmed to affect a switching sequence between, one of at least one input signal and at least one simulated input signal, and at least one output signal;
   a display screen;
   an operator unit including a button switchable to an active button in accordance with a programmable function;
   at least one signal input terminal configured to receive the at least one input signal;
   at least one signal output terminal separate from the input terminal;
   a common housing, the processing unit, the display screen, the operator unit, the at least one signal input terminal and the at least one signal output terminal accommodated in the common housing; and
   an arrangement configured to program switching functions on the basis of predetermined function in accordance with a menu-assisted user interface on the display screen;
   wherein the switching sequence of the switching function is dependent on operation of the button in the active mode to affect the switching sequence of the switching function between the at least one simulated input signal, generated by operation of the button in the active mode, and the at least one output signal.

10. A programmable controller, comprising:
    a processing means programmed to affect a switching sequence between, one of at least one input signal and at least one simulated input signal, and at least one output signal;
    a display means;
    operating means including a button switchable to an active button in accordance with a programmable function;
    at least one signal input terminal configured to receive the at least one input signal;
    at least one signal output terminal separate from the input terminal;
    a common housing, the processing means, the display means, the operating means, the at least one signal input terminal and the at least one signal output terminal accommodated in the common housing; and
    means for programming switching functions on the basis of a predetermined function in accordance with a menu-assisted user interface on the display means;
    wherein the switching sequence of the switching function is dependent on operation of the button in the active mode to affect the switching sequence of the switching function between the at least one simulated input signal, generated by operation of the button in the active mode, and the at least one output signal.

11. A method for directing current by a programmable controller, comprising the steps of:
    entering a program into a processing unit of the programmable controller, the program including switching functions configured to control current flow between at least one signal input terminal of the programmable controller and at least one signal output terminal of the programmable controller, the output terminal separate from the input terminal, the processing unit, a display screen, the input terminal and the output terminal accommodated in a common housing, the programmable controller including an arrangement configured to program switching functions of the basis of a predetermined function in accordance with a menu-assisted user interface including a button on the display screen, a sequence of a switching function dependent on operation of the button; and operating the button in an active mode so as to generate at least one simulated input signal and so as to affect the switching sequence of the switching function between the at least one simulated input signal and the at least one output signal.

* * * * *

UNITED STATES PATENT AND TRADEMARK OFFICE
CERTIFICATE OF CORRECTION

PATENT NO.    : 6,944,831 B1
DATED         : September 13, 2005
INVENTOR(S)   : Dieter Bauerfeind It is certified that error appears in the above-identified patent and that said Letters Patent is hereby corrected as shown below:

Column 2,
Line 5, change "i.e., simulated" to -- i.e., simulated, to --;

Column 3,
Line 25, change "between, one of" to -- between one of --; and

Column 4,
Lines 7 and 33, change "between, one of" to -- between one of --.

Signed and Sealed this

Seventeenth Day of January, 2006

JON W. DUDAS
*Director of the United States Patent and Trademark Office*